US009833719B2

(12) United States Patent
Togawa et al.

(10) Patent No.: US 9,833,719 B2
(45) Date of Patent: Dec. 5, 2017

(54) INFORMATION PROCESSING SYSTEM, INFORMATION PROCESSING DEVICE, OUTPUT DEVICE, AND INFORMATION PROCESSING METHOD

(71) Applicant: SONY INTERACTIVE ENTERTAINMENT INC., Tokyo (JP)

(72) Inventors: Keiji Togawa, Tokyo (JP); Takeshi Yamagishi, Kanagawa (JP); Yoichi Nishimaki, Kanagawa (JP)

(73) Assignee: SONY INTERACTIVE ENTERTAINMENT INC., Tokyo (JP)

(*) Notice: Subject to any disclaimer, the term of this patent is extended or adjusted under 35 U.S.C. 154(b) by 0 days.

(21) Appl. No.: 15/039,451

(22) PCT Filed: Aug. 6, 2014

(86) PCT No.: PCT/JP2014/004100
§ 371 (c)(1),
(2) Date: May 26, 2016

(87) PCT Pub. No.: WO2015/083302
PCT Pub. Date: Jun. 11, 2015

(65) Prior Publication Data
US 2016/0346705 A1 Dec. 1, 2016

(30) Foreign Application Priority Data
Dec. 6, 2013 (JP) ................................ 2013-253521

(51) Int. Cl.
*A63H 3/36* (2006.01)
*A63H 13/00* (2006.01)
(Continued)

(52) U.S. Cl.
CPC ............... *A63H 3/36* (2013.01); *A63H 13/00* (2013.01); *A63H 13/005* (2013.01); *A63H 13/02* (2013.01);
(Continued)

(58) Field of Classification Search
CPC ... G06F 3/03547; G06F 3/0416; G06F 3/2096
See application file for complete search history.

(56) References Cited

U.S. PATENT DOCUMENTS

2012/0212427 A1* 8/2012 Li .......................... G06F 3/0488
345/173
2013/0040530 A1 2/2013 Matsuno
(Continued)

FOREIGN PATENT DOCUMENTS

JP 2004-362429 A 12/2004
JP 2012-40076 3/2012
(Continued)

OTHER PUBLICATIONS

Office Action dated Oct. 25, 2016, from the corresponding Japanese Patent Application No. 2013-253521.
(Continued)

*Primary Examiner* — Jay Liddle
*Assistant Examiner* — Alex F. R. P. Rada, II
(74) *Attorney, Agent, or Firm* — Katten Muchin Rosenman LLP

(57) ABSTRACT

A robot 150 is placed on a touch panel. When touch sensor action sections 156a to 156c provided on a bottom face 150b of the robot act on a touch pad, an information processing device shows a face image in a rectangular area 16 of a display screen 14 of the touch panel. The rectangular area 16 corresponds to the bottom face of the robot. The face image is grabbed from the bottom face 150b of the robot 150 and appears in a face section 152. Further, the brightness of
(Continued)

pixels in areas 18a and 18b of the display screen 14 is changed. The areas 18a and 18b correspond to optical sensors 160a and 160b provided on the bottom face 150b of the robot. The robot 150 detects the change in question, converting the change into a motion of an internal actuator, sound output, light emission, and so on in accordance with predetermined rules.

14 Claims, 13 Drawing Sheets

(51) Int. Cl.
| | | |
|---|---|---|
| A63H 13/02 | (2006.01) | |
| G06F 3/038 | (2013.01) | |
| G06F 3/041 | (2006.01) | |
| A63H 29/22 | (2006.01) | |
| A63H 30/04 | (2006.01) | |
| G06F 3/0354 | (2013.01) | |
| G09G 3/00 | (2006.01) | |
| G09G 3/20 | (2006.01) | |

(52) U.S. Cl.
CPC .............. *A63H 29/22* (2013.01); *A63H 30/04* (2013.01); *G06F 3/038* (2013.01); *G06F 3/03547* (2013.01); *G06F 3/041* (2013.01); *G06F 3/0416* (2013.01); *A63H 2200/00* (2013.01); *G06F 2203/04808* (2013.01); *G09G 3/002* (2013.01); *G09G 3/2096* (2013.01); *G09G 2320/0626* (2013.01)

(56) References Cited

U.S. PATENT DOCUMENTS

| | | | |
|---|---|---|---|
| 2013/0072303 A1 | 3/2013 | Mineur et al. | |
| 2013/0288560 A1* | 10/2013 | Abou-Hamda | A63H 33/005 446/175 |
| 2013/0310956 A1* | 11/2013 | Rehkemper | G05D 1/0234 700/83 |
| 2013/0324241 A1* | 12/2013 | Elliott | A63F 13/12 463/31 |
| 2014/0024287 A1* | 1/2014 | Mineur | A63F 3/00643 446/484 |

FOREIGN PATENT DOCUMENTS

| | | |
|---|---|---|
| JP | 4972218 B1 | 7/2012 |
| JP | 2013-017590 A | 1/2013 |
| JP | 2013-039207 A | 2/2013 |
| JP | 2013-535046 | 9/2013 |
| JP | 2014-75124 A | 4/2014 |
| WO | 2011/151531 A1 | 12/2011 |

OTHER PUBLICATIONS

International Preliminary Report on Patentability and Written Opinion of the International Searching Authority dated Jun. 7, 2016 from corresponding Application No. PCT/JP2014/004100.
International Search Report dated Oct. 28, 2014, from the corresponding PCT/JP2014/004100.

* cited by examiner

FIG. 3
(a)
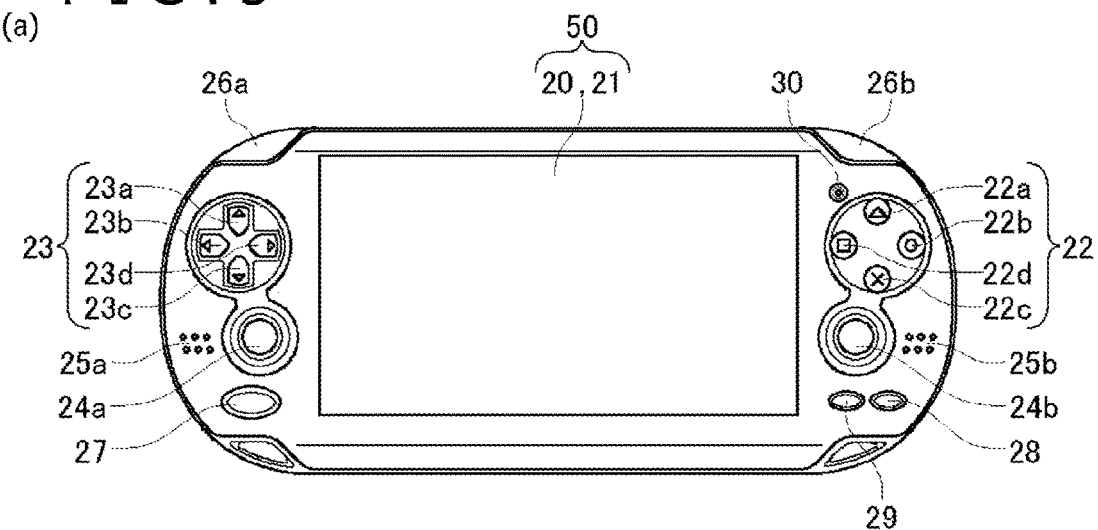
(b)
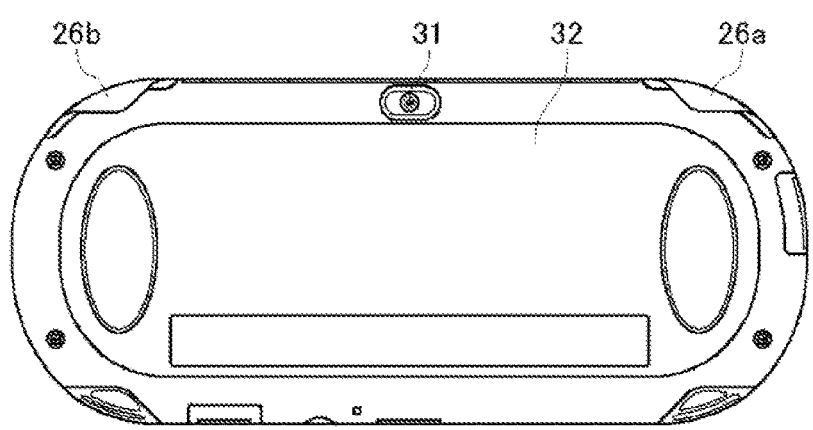

FIG. 4
(a) 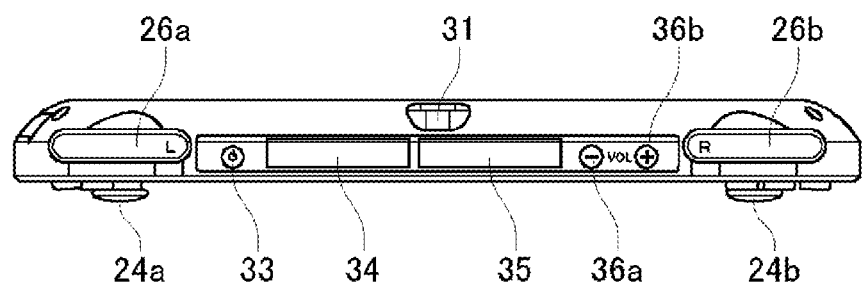
(b) 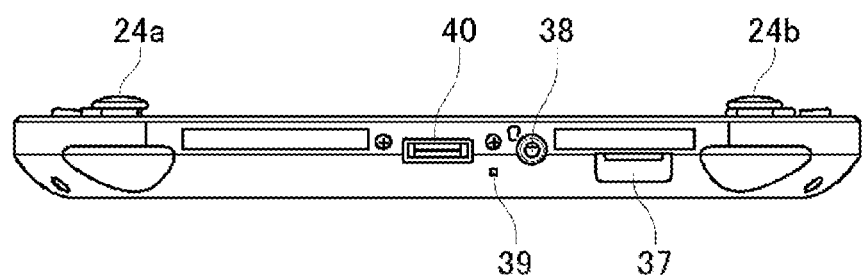
(c) 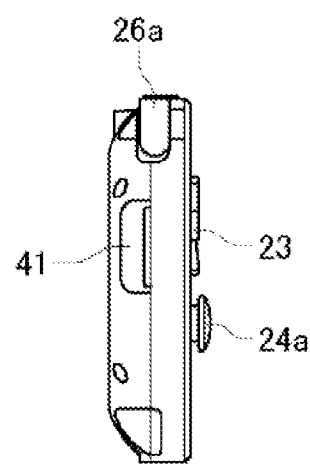

F I G . 6
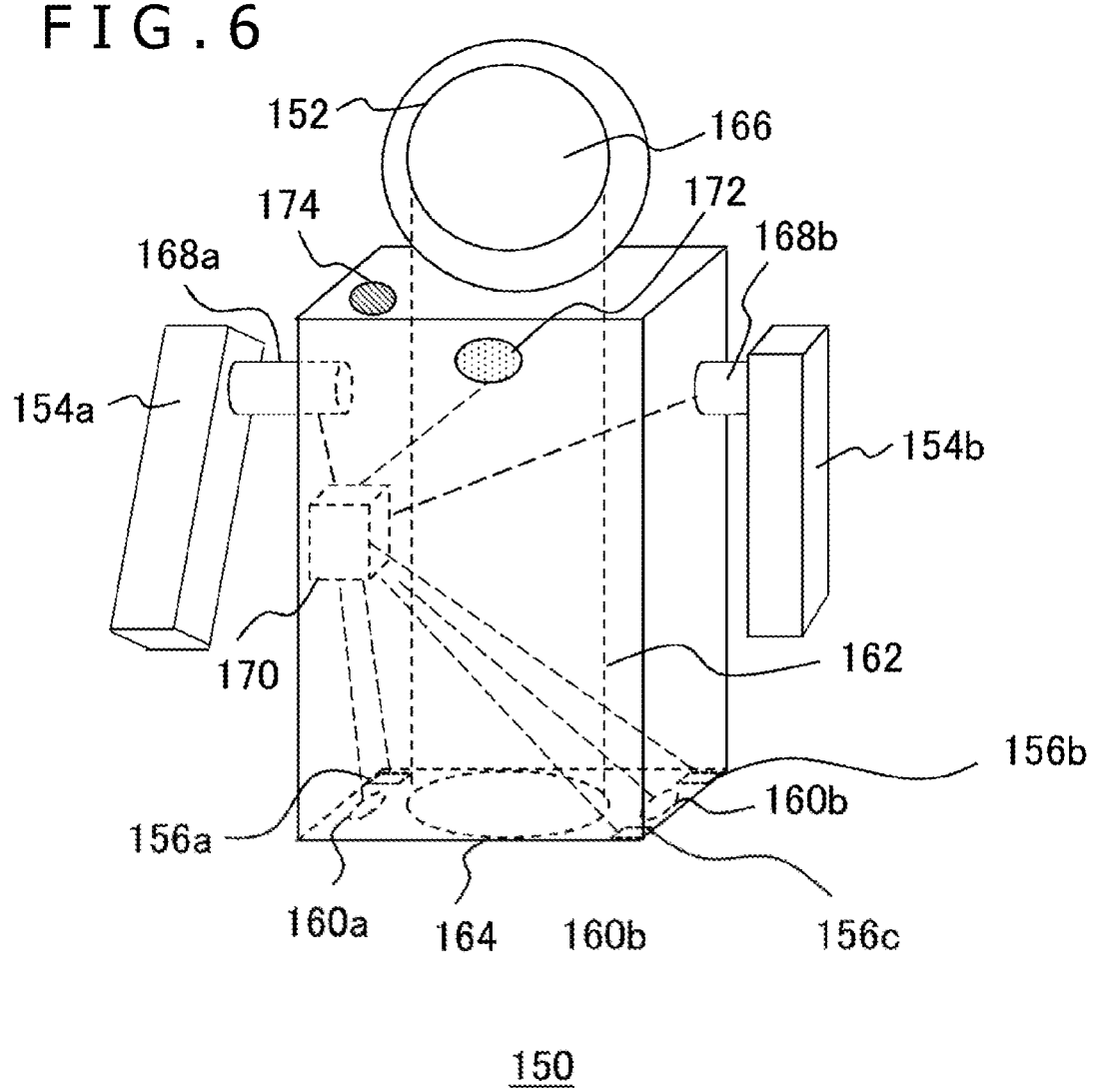

INFORMATION PROCESSING SYSTEM, INFORMATION PROCESSING DEVICE, OUTPUT DEVICE, AND INFORMATION PROCESSING METHOD

TECHNICAL FIELD

The present invention relates to an information processing technology for changing the mode of a target.

BACKGROUND ART

Technologies for moving targets such as robots existing in real spaces as intended by operators have evolved across many disciplines ranging from industrial robots to toys. In these technologies, a user basically manipulates a controller that is connected to a target (hereinafter may be referred to as a "robot" as a typical name) in a wired or wireless manner. The manipulation content is input to the robot as a signal. As a result, the robot interprets the signal or executes therein a program prepared in advance, thus allowing the robot to operate.

SUMMARY

Technical Problem

Ordinary robots as described above require a number of circuits in themselves or necessitate cables and terminals for connection to a controller. Further, initial setup and operation procedure to be handled by users become increasingly complicated. As a result, the more varied the motion and mode change, and the more robots to operate, the higher the manufacturing cost, and the heavier the burden on users. In the meantime, if a robot is provided as a toy, it is essential that the robot be inexpensive and easy to connect and operate. Against the backdrop of these requirements, however, possible motions and mode changes of robots have been significantly limited, making robots far from fascinating.

The present invention has been devised in light of the foregoing, and it is an object of the present invention to provide a device which allows varied mode changes and varied motions with minimal burden on users.

Solution to Problem

In order to solve the above problem, a mode of the present invention relates to an information processing system. The information processing system includes an information processing device and an output device. The information processing device is connected to a touch pad. The output device can be maintained in contact with the touch pad. The information processing device includes an action detection section and a display control section. The action detection section acquires information on a contact position from the touch pad. The display control section identifies the condition of the output device on the basis of the contact position, changing a display image shown on a display device provided under the touch pad in accordance with the condition.

Another mode of the present invention relates to an information processing device. The information processing device includes an action detection section and a display control section. The action detection section acquires, from a touch pad, information on a contact position of an output device that is in contact with the touch pad. The display control section identifies the condition of the output device on the basis of the contact position, changing a display image shown on a display device provided under the touch pad in accordance with the condition.

Still another mode of the present invention relates to an output device. The output device can be maintained in contact with a touch pad that is connected to an information processing device. The output device includes an input terminal section and an output control section. The input terminal section detects a change made by the information processing device to a display image shown on a display device provided under the touch pad on the basis of a contact position detected by the touch pad. The output control section produces an output appropriate to the change made to the display image.

Still another mode of the present invention relates to an information processing method. The information processing method includes a step for an information processing device to acquire, from a touch pad, information on a contact position of an output device that is in contact with the touch pad. The information processing method also includes a step for the information processing device to identify the condition of the output device on the basis of the contact position, changing a display image shown on a display device provided under the touch pad in accordance with the condition.

It should be noted that any combinations of the above components and any conversions of expressions of the present invention between "method," "device," "system," "storage medium," "computer program," and so on are also effective as modes of the present invention.

Advantageous Effect of Invention

The present invention provides a device which allows varied mode changes and varied motions in an inexpensive and easy manner.

BRIEF DESCRIPTION OF DRAWINGS

FIG. 3(*a*) is a diagram illustrating a front face of an information processing device, and (*b*) is a diagram illustrating a rear face of the information processing device.

FIG. 4(*a*) is a diagram illustrating a top face of the information processing device, (*b*) is a diagram illustrating a bottom face of the information processing device, and (*c*) is a diagram illustrating a left side face of the information processing device.

FIG. 6 is a diagram illustrating a configuration of the robot in the present embodiment.

DESCRIPTION OF EMBODIMENT

Figure 1:
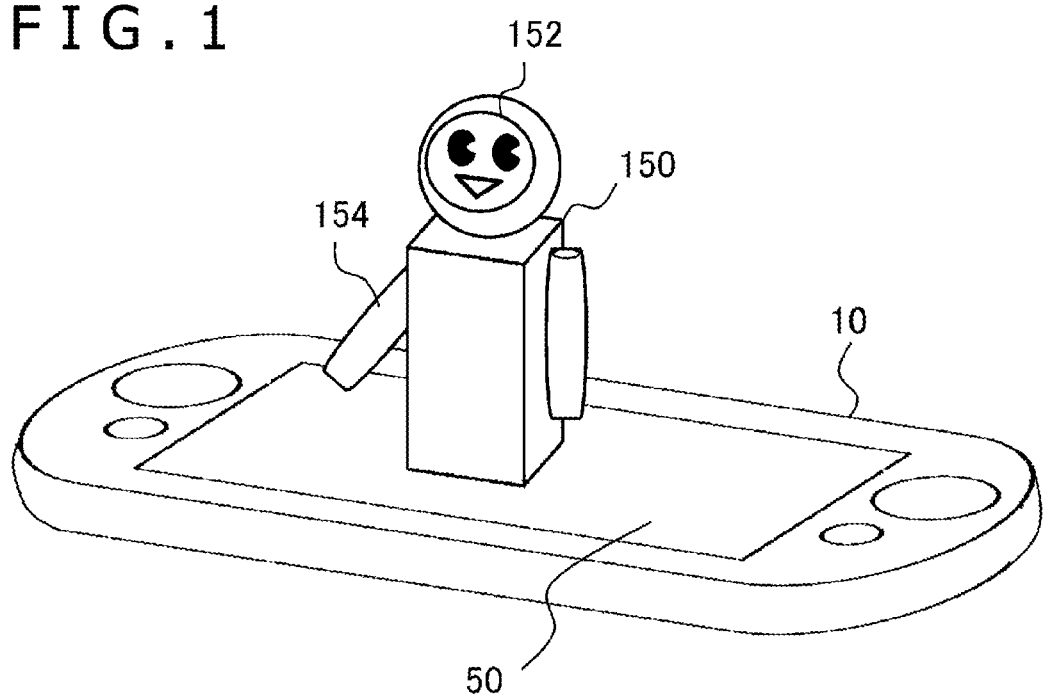
FIG. 1 is a diagram illustrating an example of usage of a robot in the present embodiment.

FIG. 1 illustrates an example of usage of a robot in the present embodiment. In the present embodiment, a robot 150 is activated when placed on a touch panel 50 that is provided in an information processing device 10. The touch panel 50 includes a display device and a transparent touch pad that covers a surface of the display device. When the robot 150 is placed on the touch panel 50, the touch pad detects the contact. In response, the information processing device 10 makes a change to what shows in an area with which the robot 150 is in contact.

The robot 150 acquires such a change to what shows as input information from the information processing device, changing its mode in accordance therewith. In the example shown in FIG. 1, a face section 152 of the robot 150 shows a face image displayed in the area of the touch panel 50 with which area a bottom face of the robot 150 is in contact. An arm section 154 of the robot 150 moves as an actuator connected to the arm section 154 is driven following detection, with an optical sensor, of a change in brightness of a portion of the area with which the bottom face of the robot 150 is in contact. In addition, the robot 150 may produce a sound or emit light in response to a change in brightness.

Thus, in the present embodiment, a change in what shows on the information processing device 10 is basically used as an input signal supplied to the robot 150, making a change to the appearance of the robot 150 or moving the robot 150. In that sense, the robot 150 can be considered an output device that corresponds to and is separate from the information processing device 10. Further, the robot 150 physically switches on the robot 150 side the touch pad of the touch panel 50 between two conditions, one in which the touch pad detects contact and the other in which the touch pad does not (hereinafter referred to as "ON/OFF" of the action on the touch pad), thus allowing a signal to be input from the robot 150 to the information processing device 10. In any case, by permitting mutual communication between the robot 150 and the information processing device 10 via the touch panel 50 rather than connecting them, for example, with a cable, it is possible to provide a robot that is capable of varied motions and whose appearance changes in a varied manner even with a simple configuration.

It should be noted that the appearances of the information processing device 10 and the robot 150 are not limited to those illustrated in the figure. For example, the touch panel 50 may be separated from the main body of the information processing device and be connected thereto by a cable or wirelessly. Alternatively, the information processing device 10 may be a game board used exclusively for the robot 150. Further, the robot 150 may not be in the shape of an ordinary robot and may be in a more simple three-dimensional shape such as sphere or rectangular parallelepiped. Alternatively, the robot 150 may be in a more complicated three-dimensional shape like that of an artistic object. A plurality of robots may be placed on a multi-touch pad. Further, so long as the robot 150 can be maintained in contact by providing, for example, clamping suckers on the bottom face of the robot 150, the touch panel 50 need not be level or in the shape of a flat plate.

Figure 2:
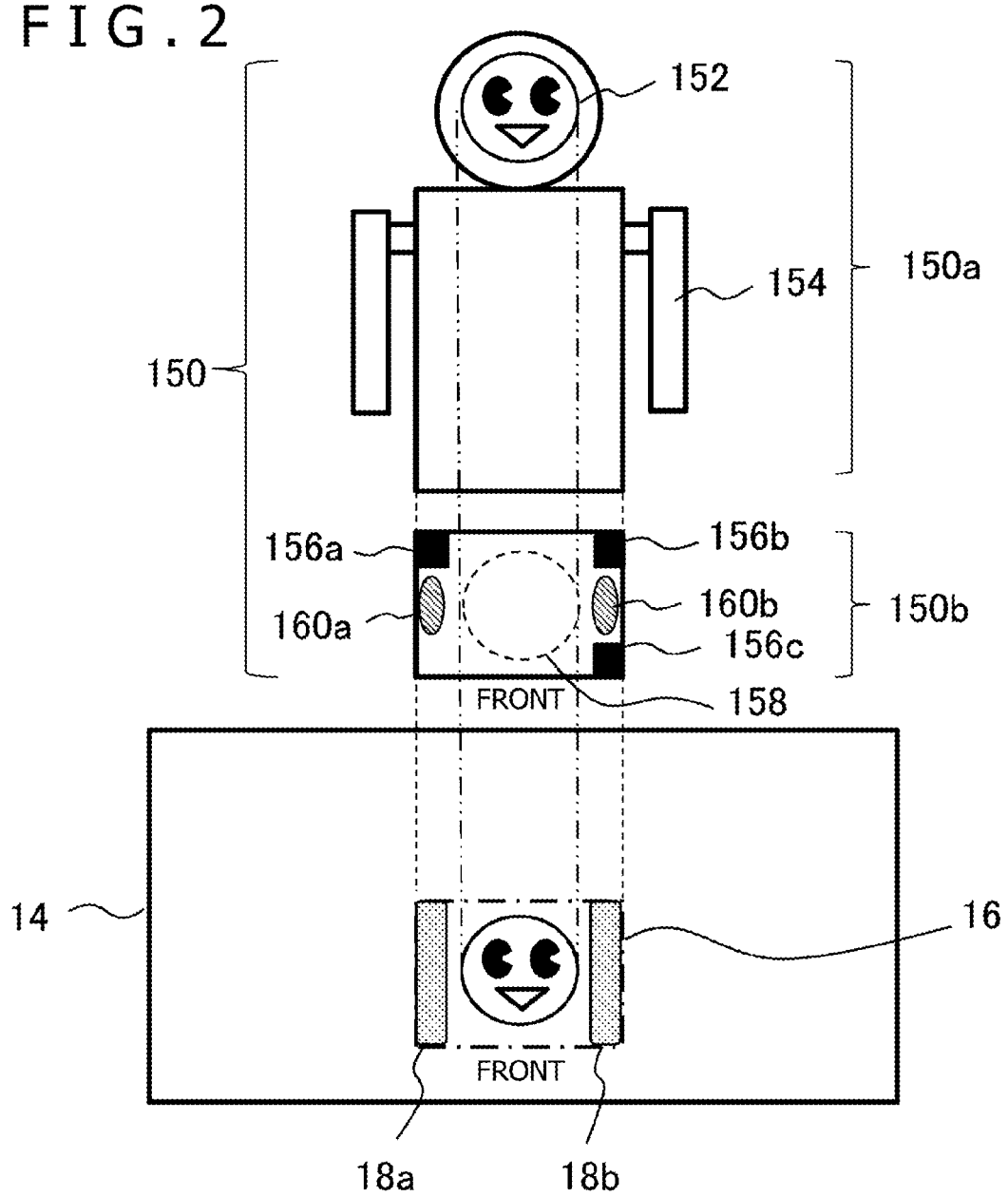
FIG. 2 is a diagram explaining the relationship between what shows on the robot and what shows on a touch panel in the present embodiment.

FIG. 2 is a diagram explaining the relationship between what shows on the robot 150 and what shows on the touch panel 150 shown in FIG. 1. The figure on the top illustrates a front face 150a and a bottom face 150b of the robot 150, and the figure on the bottom illustrates a display screen 14 of the touch panel 50. A rectangular area 16 of the display screen 14 is an area corresponding to the bottom face 150b of the robot 150. Here, the term "corresponding area" refers typically to an area with which the bottom face 150b of the robot is in contact. However, the bottom face 150b of the robot may not necessarily be in contact with the entire corresponding area. To be precise, a corresponding area is an area immediately below the bottom face 150b irrespective of the presence of a gap therebetween. Touch sensor action sections 156a to 156c are provided on the bottom face 150b of the robot 150 to make actions on the touch pad.

The touch sensor action sections 156a to 156c vary in structure depending on the contact detection method employed by the touch pad. In the case of a resistive film touch pad, for example, contact detection is achieved by forming, for example, in a projecting shape, the portions in question of the enclosure so that a pressure is applied to the touch pad surface. In the case of a capacitive touch pad, contact detection is achieved by using circuits, electric elements, and so on that change the capacitance of detection electrodes. For example, the touch sensor action sections 156a to 156c may include a step-up circuit that is connected to an unshown battery inside the robot, an oscillation circuit, and electrodes that are exposed on the bottom face so that a high voltage difference or an alternating current at a specific frequency is applied between the electrodes by power from the battery.

In the case of a scanning touch pad, the voltage scan in question is detected, thus applying a voltage to the electrodes at times appropriate to the voltage scan. Two members that produce static electricity when rubbed against each other and a motor that rubs these members may be provided so that static electricity is produced when necessary and applied to the electrodes. Alternatively, the robot 150 may be made of a conductive material that permits ground connection through the user holding the robot 150.

Instead of making contact with the user, a conductive material may be used for at least part of the robot such as its bottom face for connection with an external object, or a lead wire connected to the robot may be inserted into an unshown connector such as an earphone jack of the information processing device 10 for connection with an installation potential section inside the device, thus allowing for ground connection at a proper time and moving electric charge over the contact surface. It is to be understood by those skilled in the art that, in addition to the above, the configuration of the touch sensor action sections 156a to 156c can be selected as appropriate in accordance with the detection target of the touch pad such as ultrasonic waves, light, and magnetic fields.

The technique by which to turn OFF the action of the touch sensor action sections 156a to 156c on the touch pad also naturally varies depending on the contact detection method employed by the touch pad. In the case of a resistive film touch pad, one possible option would be to provide a mechanism such as an actuator that can change the extent of projection of the projecting portions on the bottom face so that the portions in question are physically lifted out of contact by reducing the extent of projection thereof while at the same time supporting the robot with other projecting portions. In the case of a capacitive touch pad, one possible option would be to change electric charge in such a manner as to eliminate the change in capacitance.

It should be noted that the manner in which the touch sensor action sections 156a to 156c act may be changed adaptively in accordance with the contact detection method employed by the touch pad of the information processing device 10, the detection threshold, and so on. That is, the robot may have a plurality of action mechanisms, a plurality of applied voltages, and so on. Then, input means may be provided to allow the user to switch from one robot setup to another depending on the type of the information processing device 10. Alternatively, the information processing device 10 may notify the robot 150 of a proper setup in the event of a brightness change which will be described later.

It should be noted that if ground connection is achieved through a user in one of the above modes, the touch sensor action sections 156a to 156c are switched between ON and OFF depending on whether the user is touching the robot 150. Therefore, if the information processing device 10 changes what shows in the area corresponding to the bottom face of the robot 150 and in other area in accordance with the ON and OFF statuses of the touch sensor action sections 156a to 156c, it is possible to achieve a mode in which to change what shows on the information processing device 10 and the robot 150 and their appearances when the user touches the robot.

As illustrated in the figure, the touch sensor action sections 156a to 156c are provided at three of the four corners of the bottom face 150b. When the robot 150 is placed on the touch panel 50 while the action of the touch sensor action sections 156a to 156c on the touch pad is ON, the information processing device 10 can identify the rectangular area 16. It should be noted, however, that the layout and number of touch sensor action sections 156a to 156c are not limited thereto. For example, if the extent of projection is changed as described above, or if the individual robots are identified on the basis of the positions acted on by the touch sensor action sections 156a to 156c, as many touch sensor action sections as necessary may be provided. Further, if the touch sensor action sections are laid out asymmetrically on front and rear portions of the robot as illustrated, the orientation of the robot can be identified. However, if the robot is configured so as not to be distinguished between front and rear sides, the number of touch sensor action sections can be reduced.

Once the rectangular area 16 is identified, the information processing device 10 displays a given image in the rectangular area 16 of the display screen 14. In the case of the figure, a face image that should appear in the face section 152 of the robot 150 is shown. The image in question may be a still image or a movie. Further, what shows need not be an image representing a target such as a painting or a photograph, and the type thereof is not limited so long as it can be expressed by display such as a text, a filled area, a graphic, or a pattern. The image in question is grabbed from a corresponding area 158 of the bottom face 150a of the robot 150 and appears in the face section 152. Various mechanisms can be used to display an image grabbed from the bottom face 150a in other area such as the face section 152. An image may be displayed by reflection of light using a so-called TV stone (ulexite), an optical fiber, a mirror, and so on. Alternatively, electronic image data may be transferred by connecting a camera to a monitor.

Further, optical sensors 160a and 160b are provided on the bottom face 150b of the robot 150. Then, the brightness of the pixels of areas 18a and 18b is changed, the areas 18a and 18b being inside the rectangular area 16 of the display screen 14 and corresponding to the optical sensors 160a and 160b. This change in pixel brightness is supplied to the robot 150 as a signal. The robot 150 detects the change in question, converting the change into a motion of an internal actuator, sound output, light emission, and so on in accordance with predetermined rules. It should be noted that signal input from the information processing device 10 to the robot 150 is not limited to a change in pixel brightness in a display device as described above. Instead, radio waves, infrared rays, sound waves, and so on may also be used. In this case, sensors designed to detect these physical quantities are employed rather than optical sensors. If a mechanism adapted to generate, for example, radio waves, infrared rays, or sound waves is provided in the information processing device 10, the position of the sensor on the robot 150 is not limited to the bottom face 150b of the robot 150, and the sensor may be provided at a location corresponding to that of the generation mechanism.

It should be noted that the rectangular area 16 in the form of a frame may be displayed on the display screen as a fixed area on the touch panel 12 so that the robot 150 is placed on the rectangular area 16 in a given orientation. In this case, it is only necessary to detect whether the robot 150 has been placed, thus eliminating the need for a plurality of touch sensor action sections that identify the rectangular area 16. If the robot 150 is located at an arbitrary position and faces an arbitrary orientation, the front and rear of the robot are identified by the layout of the touch sensor action sections 156a to 156c as described above, thus adjusting the rotation angle of a face appearing on the display screen 14 in such a manner that the face appears in a correct orientation in the face section 152 of the robot 150.

A description will be given next of a configuration example of the information processing device 10. In this example, the information processing device 10 can perform ordinary information processing tasks such as gaming, content display, and communication in addition to coordinated operation with the robot necessary in the present embodiment. It should be noted, however, that various shapes and configurations of the information processing device 10 are possible as described earlier, and that the example does not purport to limit the present invention to the shape and configuration which will be described below.

FIG. 3(a) illustrates a front face of the information processing device 10. The information processing device 10 is formed with an oblong enclosure, and each of the left and right areas to be held by a user has a circular-arc outer contour. The rectangular touch panel 50 is provided on the front face of the information processing device 10. The touch panel 50 includes a display device 20 and a transparent front face touch pad 21 that covers the surface of the display device 20. The display device 20 is an organic EL (Electro-Luminescence) panel and shows images. It should be noted that the display device 20 may be display means such as a liquid crystal panel. The front face touch pad 21 is a multi-touch pad capable of detecting a plurality of simultaneously touched points, and the touch panel 50 is configured as a multi-touch screen.

A triangle-marked button 22a, a circle-marked button 22b, a cross-marked button 22c, and a square-marked button 22d (hereinafter referred to as "action buttons 22" if done so collectively) are provided on the right side of the touch panel 50, with each of these buttons located at a vertex of a rhombus. An up key 23a, a left key 23b, a down key 23c, and a right key 23d (hereinafter referred to as "directional keys 23" if done so collectively) are provided on the left side of the touch panel 50. The user can input eight directions, namely, up, down, left, right, and diagonal directions by operating the directional keys 23.

A left stick 24a is provided below the directional keys 23, and a right stick 24b is provided below the action buttons 22. The user inputs a direction and an amount of tilt by tilting the left stick 24a or right stick 24b (the two sticks will be hereinafter referred to as "analog sticks 24" if done so collectively). An L button 26a and an R button 26b are provided respectively at left and right vertex portions of the enclosure. The action buttons 22, the directional keys 23, the analog sticks 24, the L button 26a, and the R button 26b make up the operation means operated by the user.

A front face camera 30 is provided near the action buttons 22. A left speaker 25a and a right speaker 25b (hereinafter referred to as "speakers 25" if done so collectively) are provided respectively on the left side of the left stick 24a and on the right side of the right stick 24b to produce sounds. Further, a HOME button 27 is provided below the left stick 24a, and a START button 28 and a SELECT button 29 are provided below the right stick 24b.

FIG. 3(b) illustrates a rear face of the information processing device 10. A rear face camera 31 and a rear face touch pad 32 are provided on the rear face of the information processing device 10. The rear face touch pad 32 is formed as a multi-touch pad as is the front face touch pad 21. The information processing device 10 has two cameras and two touch pads on the front and rear faces thereof.

FIG. 4(a) illustrates a top face of the information processing device 10. The L button 26a and the R button 26b are provided respectively on the left end side and the right end side of the top face of the information processing device 10 as described earlier. A power button 33 is provided on the right side of the L button 26a. The user can turn the power ON or OFF by pressing the power button 33. It should be noted that the information processing device 10 has a power control function that allows the information processing device 10 to switch to a suspended state if none of the operation means is operated (if no-operation time continues) for a given period of time or more. When the information processing device 10 goes into the suspended state, the user can bring the information processing device 10 back into an awake state from the suspended state by pressing the power button 33.

A game card slot 34 is a slot for a game card to be inserted into. The figure shows that the game card slot 34 is covered with a slot cover. It should be noted that an LED lamp may be provided near the game card slot 34 to flash when the game card is accessed. An accessory terminal 35 is used for connection with peripheral devices (accessories). The figure shows that the accessory terminal 35 is covered with a terminal cover. A − button 36a and a + button 36b are provided between the accessory terminal 35 and the R button 26b to adjust the volume.

FIG. 4(b) illustrates a bottom face of the information processing device 10. A memory card slot 37 is a slot for a memory card to be inserted into. The figure shows that the memory card slot 37 is covered with a slot cover. An audio input/output terminal 38, a microphone 39, and a multi-use terminal 40 are provided on the bottom face of the information processing device 10. The multi-use terminal 40 supports USB (Universal Serial Bus), allowing for connection with other devices via a USB cable.

FIG. 4(c) illustrates a left side face of the information processing device 10. A SIM card slot 41 is formed in the left side face of the information processing device 10, the SIM card slot 41 being a slot for a SIM card to be inserted into.

Figure 5:
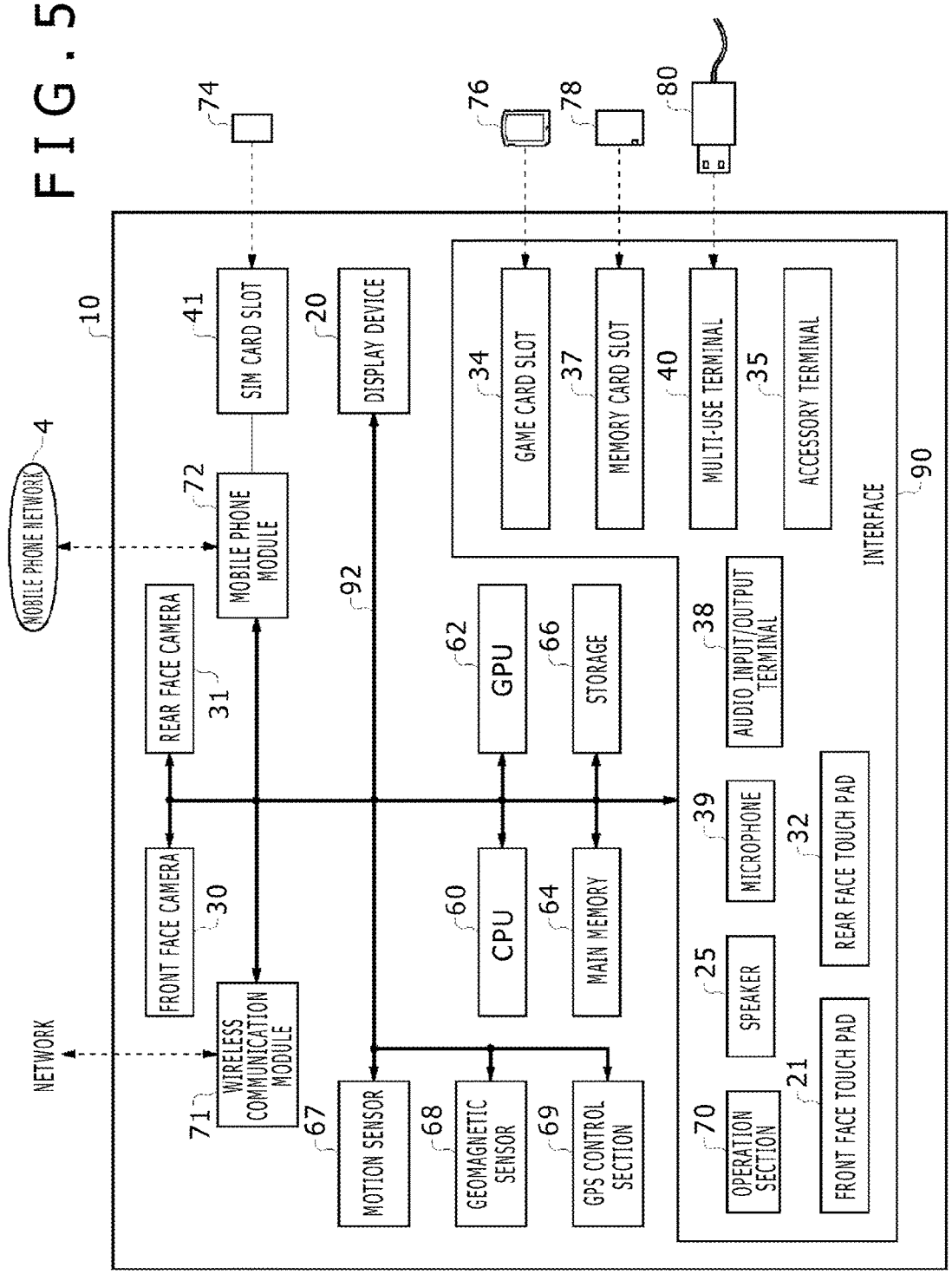
FIG. 5 is a diagram illustrating a circuit configuration of the information processing device.

FIG. 5 illustrates a circuit configuration of the information processing device 10. The components thereof are connected to each other by a bus 92. A wireless communication module 71 includes a wireless LAN module compliant with a communication standard such as IEEE802.11b/g and connects to an external network such as the Internet via a wireless access point or the like. It should be noted that the wireless communication module 71 may have a Bluetooth (registered trademark) protocol communication function. A mobile phone module 72 supports the third generation digital mobile phone system compliant with the IMT-2000 (International Mobile Telecommunication 2000) standard defined by the ITU (International Telecommunication Union), connecting to a mobile phone network 4. A SIM card 74 is inserted into the SIM card slot 41. The SIM card 74 stores a unique ID number for identifying the mobile phone number. When the SIM card 74 is inserted into the SIM card slot 41, the mobile phone module 72 can communicate with the mobile phone network 4.

A CPU (Central Processing Unit) 60 executes, for example, a program loaded into a main memory 64. A GPU (Graphics Processing Unit) 62 performs calculations required for image processing. The main memory 64 includes, for example, a RAM (Random Access Memory), storing programs and data used by the CPU 60. A storage 66 includes, for example, a NAND-type flash memory for use as a built-in auxiliary storage device.

A motion sensor 67 detects the motion of the information processing device 10. A geomagnetic sensor 68 detects geomagnetism in three axial directions. A GPS control section 69 receives signals from a GPS satellite, calculating the current position. The front face camera 30 and the rear face camera 31 capture images and input image data. Each of the front face camera 30 and the rear face camera 31 includes a CMOS image sensor (Complementary Metal Oxide Semiconductor Image Sensor).

The display device 20 is an organic EL display device and has light-emitting elements that emit light when a voltage is applied between the cathode and anode thereof. In power saving mode, a lower-than-normal voltage is applied between the electrodes, thus allowing the display device 20 to be dimmed and contributing to reduced power consumption. It should be noted that the display device 20 may be a liquid crystal panel display device with a backlight. In power saving mode, the liquid crystal panel display device can be dimmed by reducing the backlight intensity, thus reducing power consumption.

In an interface 90, an operation section 70 includes various operation means of the information processing device 10, and more specifically, the action buttons 22, the directional keys 23, the analog sticks 24, the L button 26a, the R button 26b, the HOME button 27, the START button 28, the SELECT button 29, the power button 33, the − button 36a, and the + button 36b. The front face touch pad 21 and the rear face touch pad 32 are multi-touch pads. The front face touch pad 21 is arranged on top of the surface of the display device 20. The speakers 25 output sounds generated by the different functions of the information processing device 10. The microphone 39 inputs ambient sounds of the information processing device 10. The audio input/output terminal 38 inputs stereo sounds from an external microphone and outputs stereo sounds to an external headphone or other device.

A game card 76 that stores a game file is inserted into the game card slot 34. The game card 76 has a data-writable storage area, and data writing or reading by a media drive begins when the game card 76 is loaded into the game card slot 34. A memory card 78 is inserted into the memory card slot 37. The memory card 78 is used as an external auxiliary storage device when loaded into the memory card slot 37. The multi-use terminal 40 can be used as a USB terminal and handles data exchange with other USB devices via a USB cable 80. A peripheral device is connected to the accessory terminal 35.

FIG. 6 illustrates a configuration of the robot 150. The robot 150 includes an image transfer mechanism 162 that grabs an image such as a face appearing on the touch panel 50 of the information processing device 10 and shows the image at a given location. An image grabbing terminal section 164, one end of the image transfer mechanism 162, is provided on the bottom face, and an image display section 166, another end of the image transfer mechanism 162, is provided at a given position such as the face section 152. The touch sensor action sections 156a to 156c and the optical sensors 160a and 160b are further provided on the bottom face. The touch sensor action sections 156a to 156c act on the touch pad of the information processing device 10. The optical sensors 160a and 160b acquire the change in brightness of the touch panel 50. Further, the robot 150 has actuators 168a and 168b, a speaker 172, and a control circuit 170. The actuators 168a and 168b move arm sections 154a and 154b. The speaker 172 outputs sounds. The control circuit 170 controls the operation of these components. Still further, the robot 150 may include an environmental parameter sensor 174 that detects at least one of parameters representing the surrounding environment such as illuminance, temperature, and elapsed time (hereinafter referred to as "environmental parameters").

The control circuit 170 acquires brightness information of the touch panel 50 acquired by the optical sensors 160a and 160b at any time and interprets the information as a signal, thus driving the actuators 168a and 168b and outputting sounds from the speaker 172. Therefore, the control circuit 170 stores a robot operation table that associates brightness change patterns with motions of the actuators 168a and 168b and audio data to be output. The control circuit 170 also controls the action of the touch sensor action sections 156a to 156c on the touch pad to turn ON and OFF. For example, the control circuit 170 switches the action of any one of the touch sensor action sections 156a to 156c between ON and OFF in response to a change in the parameter representing the environment detected by the environmental parameter sensor 174. The information processing device 10 interprets the change as a signal supplied from the robot 150, thus switching the image to show or changing the brightness and giving a feedback to what shows on the robot 150 or its operation.

It should be noted that the actuators and the speaker illustrated in the figure are merely an example of the present embodiment. Instead, light emitting diodes for causing the robot 150 to emit light may be installed as described above, or actuators may be provided at different portions. Further, the robot 150 need not include all the components of the structure illustrated in the figure, and components may be selected as appropriate in terms of purpose of use, design, price, and so on. Still further, a plurality of blocks, each containing any one of the components, may be presented so that the user can assemble the blocks to match his or her preference. Still further, the robot 150 may include a battery, a power button, and so on as appropriate. Still further, the bottom face of the robot, and the touch sensor action sections 156a to 156c in particular, may be covered, for example, with elastomer to provide elasticity so that the touch sensor action sections 156a to 156c come into stable and flexible contact with the touch pad.

Figure 7:
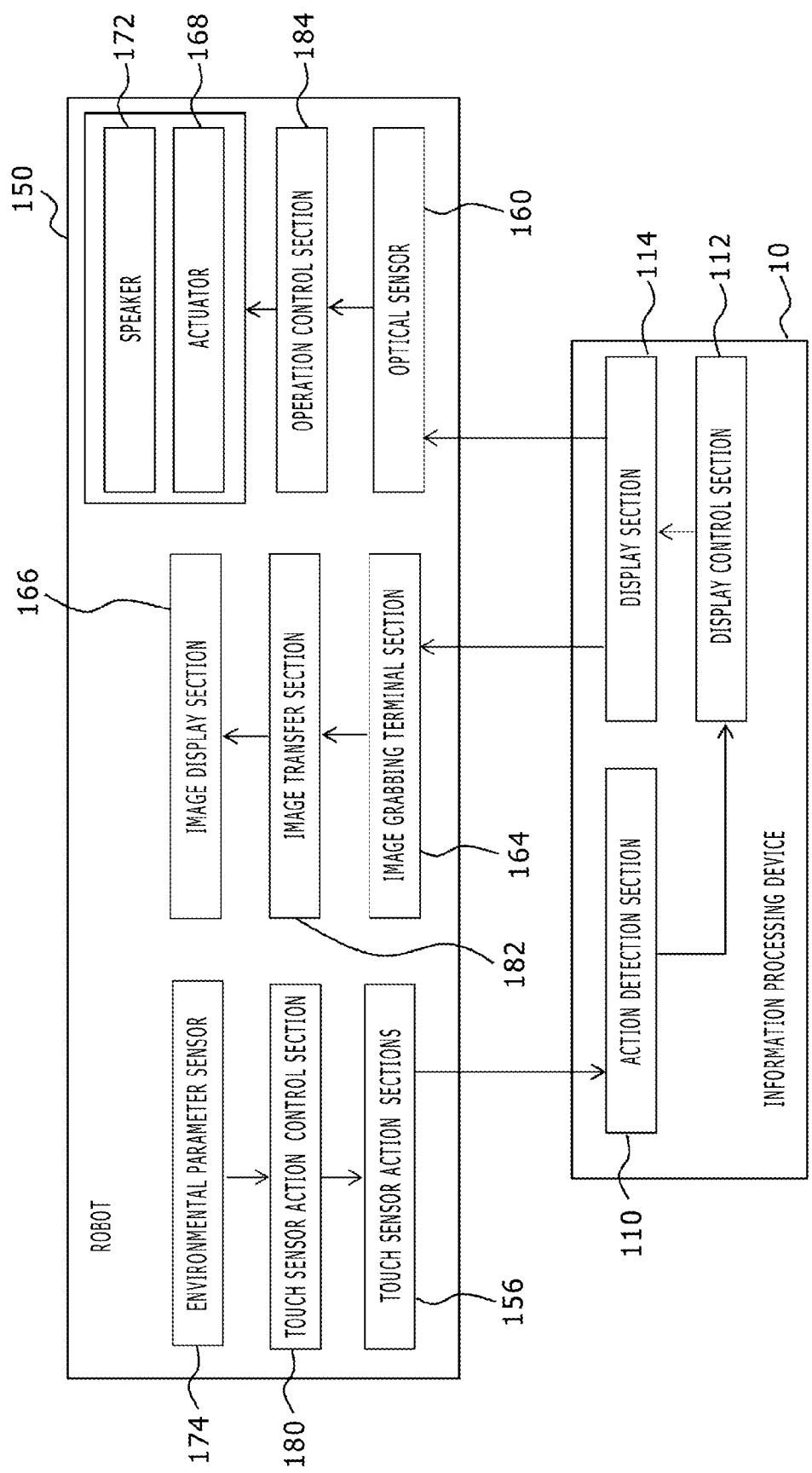
FIG. 7 is a diagram illustrating a configuration of functional blocks of the robot and the information processing device in the present embodiment.

FIG. 7 illustrates a configuration of functional blocks of the robot 150 and the information processing device 10. In FIG. 7, each of the components described as functional blocks adapted to perform a variety of processing tasks can be configured with CPUs, memories, and other LSIs in terms of hardware, and by a program loaded from a storage medium into a memory in terms of software. Therefore, it is understood by those skilled in the art that these functional blocks can be implemented in a variety of ways by hardware alone, software alone, or by a combination thereof and are not limited to any one of them.

The robot 150 includes a touch sensor action control section 180, an image transfer section 182, and an operation control section 184. The touch sensor action control section 180 controls the action of the touch sensor action sections 156a to 156c (collectively referred to as the touch sensor action sections 156) on the touch pad on the basis of information from the environmental parameter sensor 174 illustrated in FIG. 6 or the like. The image transfer section 182 grabs an image from the image grabbing terminal section 164, showing the image on the image display section 166 such as the face section. The operation control section 184 acquires information about brightness change from the optical sensors 160a and 160b (collectively referred to as the optical sensors 160), controlling the driving of the actuators 168a and 168b (collectively referred to as the actuators 168) and sound output from the speaker 172 in accordance with the brightness change information.

The information processing device 10 includes an action detection section 110, a display control section 112, and a display section 114. The action detection section 110 detects an action from the touch sensor action sections 156 of the robot 150. The display control section 112 derives the screen area corresponding to the bottom face of the robot 150 and the orientation of the robot 150, generating image data for showing a face or other image in a proper orientation and position or changing the brightness of a given location. The display section 114 outputs the generated image data as an image.

The touch sensor action control section 180 of the robot 150 controls the action of the touch sensor action sections 156 on the touch pad to turn ON and OFF by the method appropriate to the detection method of the touch pad as described above. As will be described later, if the identification of the individual robot 150 is represented by the position of the touch sensor action section 156 that is ON, the touch sensor action section 156 to be turned ON is determined on the basis of information of the position in question specified for each robot.

If the change in environmental parameter detected by the environmental parameter sensor 174 is reflected in the robot 150, the given touch sensor action section 156 is turned ON and OFF in a pattern appropriate to the parameter change. Here, "pattern" may be a time when the action of one of the touch sensor action sections is switched between ON and OFF (change in ON/OFF status over time), or positions of those of the plurality of touch sensor action sections to be turned ON or a combination thereof. Alternatively, "pattern" may be a change over time in positions of the touch sensor action sections that are ON.

Therefore, the touch sensor action control section 180 includes a memory for storing a touch sensor action change table that associates the change in environmental parameter with the pattern of change in the touch sensor action sections 156. The environmental parameter sensor 174 may be an illuminance sensor, a temperature sensor, a microphone, a timer, or other device that measures a given environmental parameter. Alternatively, the environmental parameter sensor 174 may be a combination of two or more such devices.

The image transfer section 182 is a functional block that transfers an image from the image grabbing terminal section 164 to the image display section 166 in the image transfer mechanism 162 described with reference to FIG. 6. The image transfer section 182 is a substance that reflects light if the image is transferred by reflection of light as described above. On the other hand, the image transfer section 182 is, for example, a transmission cable if the image is transferred electrically. The operation control section 184 drives the actuators 168 and outputs sounds from the speaker 172 on the basis of the change in pixel brightness of the display device acquired by the optical sensors 160 in such a manner that the actuator motion and the speaker sounds match the brightness change.

Therefore, the operation control section 184 includes a memory for storing a robot operation table that associates patterns of brightness change with parameters defining the operation of the actuators 168, audio data to be output, and so on. The parameters defining the operation of the actuators 168 include driving directions, rotation angles, oscillation periods, driving times, and so on. Here, "pattern" of brightness change may be a time when the pixels are switched between emission and non-emission in a single display area (change in ON/OFF status over time), or positions of those of the plurality of display areas from which to emit light or a combination thereof. Alternatively, "pattern" may be a change over time in positions of display areas that emit light. Further, the brightness level need not be binary such as emission or non-emission. Instead, the brightness level may be varied in multiple steps using a plurality of gray levels. Further, color information may be detected so that the change in color information is used.

If the actuators 168 move to perform a behavior determined by the operation control section 184, the arm section 154 illustrated in FIG. 1, for example, shakes longitudinally or rotates. In addition, an ornament or a bullet (not shown) fastened by compressing a spring may be sent flying by moving the fastened portion with the actuators 168 and releasing the spring. Alternatively, a given beep tone, a synthetic sound generated in advance, or a recoded sound, is produced by outputting as a sound the audio data determined by the operation control section 184 from the speaker 172. The audio data in question is also stored in advance in the internal memory of the operation control section 184.

The action detection section 110 of the information processing device 10 includes the touch pad 21 of the touch panel 50 illustrated in FIG. 3, the CPU 60, and so on. When the touch sensor action sections 156 of the robot 150 turn ON or when the touch sensor action sections 156 that are ON come into contact, the action detection section 110 detect the contact position. The touch pad 21 is a multi-touch pad, thus detecting contact of the touch sensor action sections 156 regardless of the number of contact points, converting the contact into coordinates on the display, and notifying the display control section 112.

In the example illustrated in FIG. 2, three contact points of the touch sensor action sections 156*a* to 156*c* are detected. On the basis of position information thereof, therefore, the display control section 112 can identify the area (rectangular area 16 in FIG. 2) with which the bottom face of the robot 150 is in contact and the side of the area corresponding to the front face of the robot. Then, the display control section 112 generates display image data that shows an image to be shown such as the robot face. The display control section 112 does so in the area, of all the area in question, where the image grabbing terminal section 164 is located.

Further, the display control section 112 changes the brightness of the area where the optical sensors 160 of the bottom face of the robot 150 are located. This light emission is designed to move the robot 150 and output sounds as described above. Therefore, the brightness is changed in a pattern appropriate to the objective when the robot 150 should be moved or sounds should be output. For example, when the robot 150 changes the action of the touch sensor action sections 156 in accordance with the output value of the environmental parameter sensor 174, the display control section 112 changes the brightness in a pattern appropriate to the change in action. Alternatively, an illuminance sensor, a temperature sensor, a microphone, a timer, or other environmental parameter sensor may be provided on the information processing device 10 side so that the brightness is changed in a pattern appropriate to the change in that parameter.

Alternatively, no specific time may be specified. Instead, the robot 150 may be moved not at a specific time but steadily at all times when the robot 150 is in contact by changing the brightness in the same pattern or emitting light at a constant brightness without changing the brightness over time. The display control section 112 includes the CPU 60, the main memory 64, and so on illustrated in FIG. 5, performing the above processing steps on the basis of the program and so on loaded into the main memory 64, for example, from the storage 66 or one of various storage media. The display section 114 includes the display device 20 of the touch panel 50 illustrated in FIG. 3, outputting display image data, generated by the display control section 112, as an image.

Figure 8:
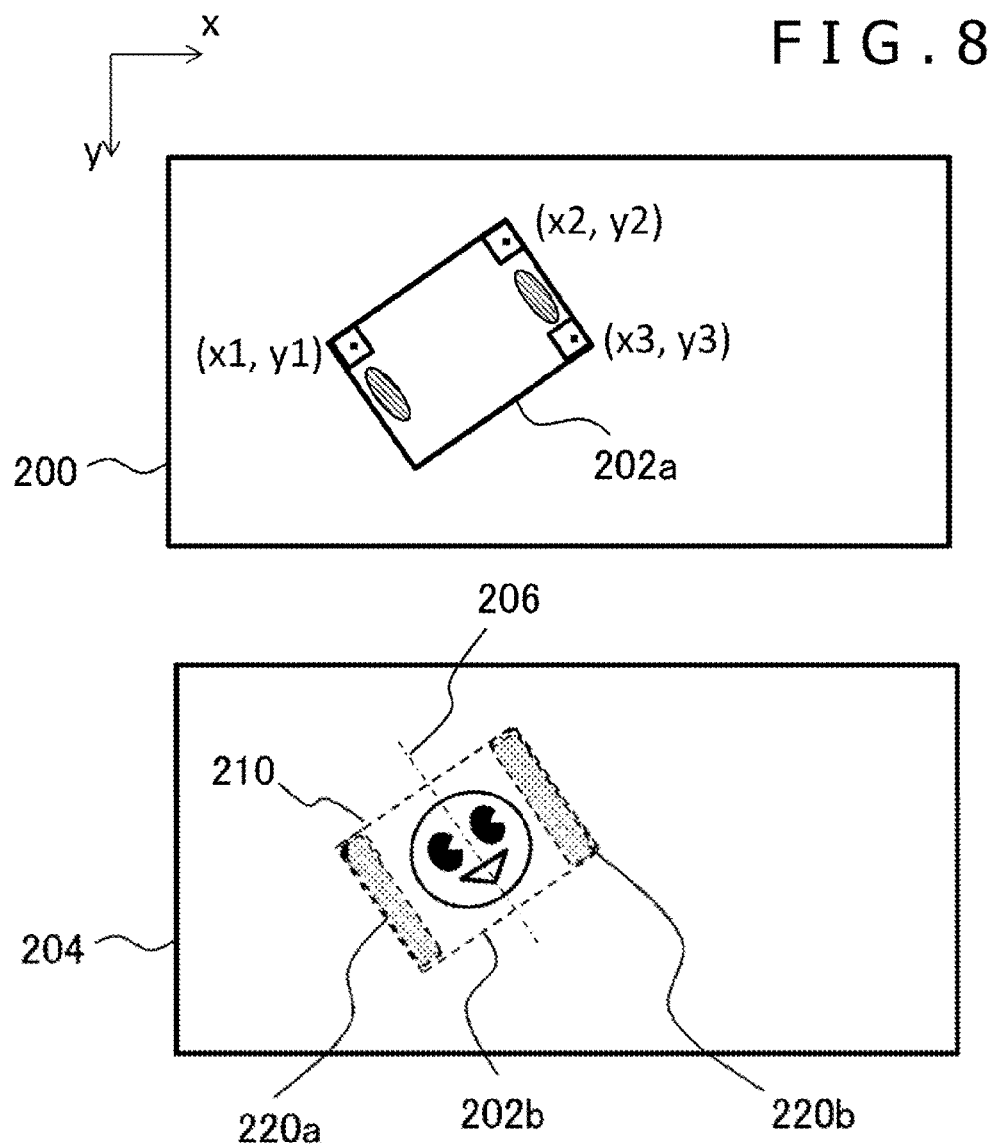
FIG. 8 is a diagram illustrating the relationship between the robot located at an arbitrary position and a display image in the present embodiment.

FIG. 8 illustrates the relationship between the robot located at an arbitrary position and a display image. The figure on the top illustrates the position of the bottom face of the robot 150 relative to a screen area 200 of the touch panel 50. When the robot 150 is located at such a position, the action detection section 110 of the information processing device 10 identifies the coordinates of, for example, the centers of the three touch sensor action sections 156 as (x1, y1), (x2, y2), and (x3, y3) in the display coordinate system. As a result, the display control section 112 identifies the rectangle that forms the bottom face of the robot 150 from distances between the three sets of coordinates, and at the same time, identifies a side 202*a* that corresponds to the front face of the robot out of the sides making up the rectangle.

Then, the display control section 112 generates a display screen 204. The display screen 204 shows a face image in the area inside the identified rectangular area 210 where the image grabbing terminal section 164 on the bottom face of the robot is located as illustrated in the bottom figure of FIG. 8. At this time, the face image is rotated as appropriate so that the face image appears in a proper orientation in the face section of the robot 150. As illustrated in the figure, for example, the angle at which to show the face image is determined so that the lower side of the face is located on the side of a side 202b that corresponds to the front face of the robot 150, and so that a center axis 206 of the face perpendicularly intersects the side 202b. It should be noted, however, that the proper face angle is not limited to the example illustrated depending on the image transfer method employed by the image transfer mechanism 162. The display control section 112 further determines, as areas 220a and 220b subject to brightness change, the areas inside the rectangular area 210 where the optical sensors 160 of the bottom face of the robot are located, changing the brightness at given times as described above.

Figure 9:
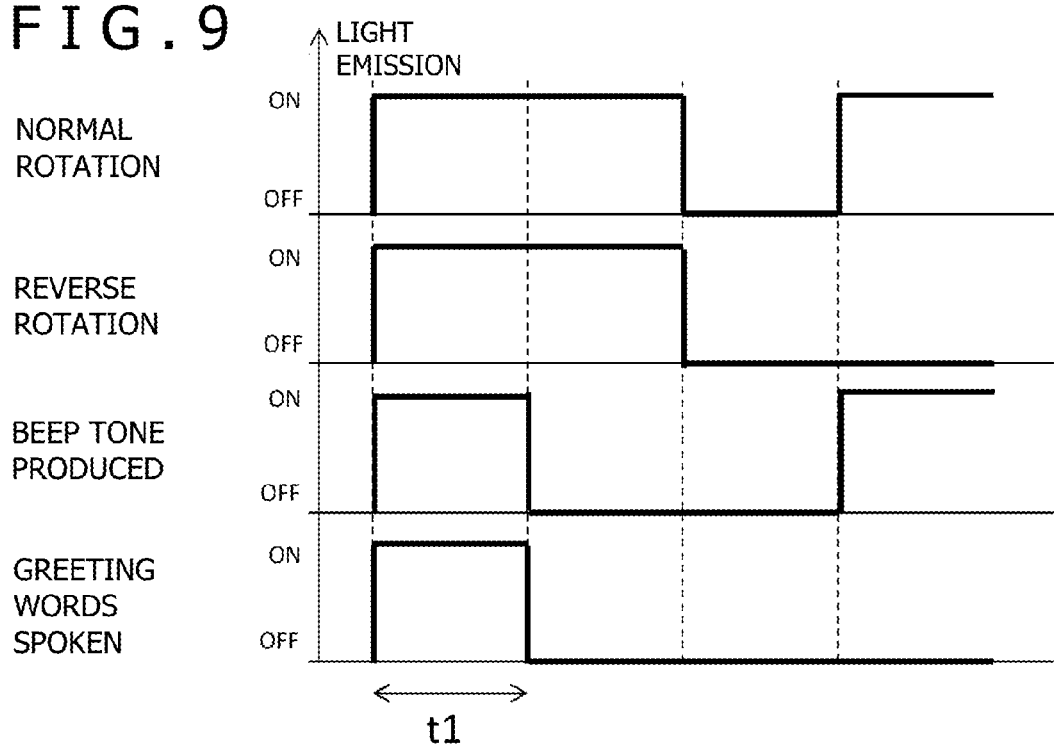
FIG. 9 is a diagram illustrating a change in brightness of a display screen and a robot operation determined by an operation control section of the robot in accordance with the change in the present embodiment.

FIG. 9 illustrates a change in brightness of the areas 220a and 220b of the display screen 204 and robot operation determined by the operation control section 184 of the robot 150 in response to the change in brightness. In this example, the actuator motion or sound output is switched in a pattern that turns pixel emission ON or OFF in the areas 220a and 220b during a time that is four given periods t1 long. Association information as illustrated in the figure is internally held by the operation control section 184 as a robot operation table. Further, the times when the ON/OFF patterns take place are set, for example, by a program in the display control section 112 of the information processing device 10.

In the example illustrated in FIG. 9, the ON/ON/OFF/ON emission pattern is set to rotate the arm section in normal direction. The ON/ON/OFF/OFF emission pattern is set to rotate the arm section in reverse direction. The ON/OFF/OFF/ON emission pattern is set to produce a beep tone. The ON/OFF/OFF/OFF emission pattern is set to cause greeting words such as "Hello" to be output.

These settings are merely examples, and varied motions and sound outputs can be implemented by using various brightness change patterns. For example, brightness change patterns are not limited to rectangular waves and may be sinusoidal waves. Alternatively, a plurality of thresholds may be provided for brightness with multiple gray levels so that what processing task to perform is set for each pattern of multiple steps of brightness change. Further, a light emitter such as a light emitting diode may be provided on the robot 150 so that light is emitted in accordance with a brightness change pattern as described above. Alternatively, actuator motion and sound output may be performed separately as illustrated in the figure. Still alternatively, a plurality of processing tasks may be performed for a single brightness change pattern.

Figure 10:
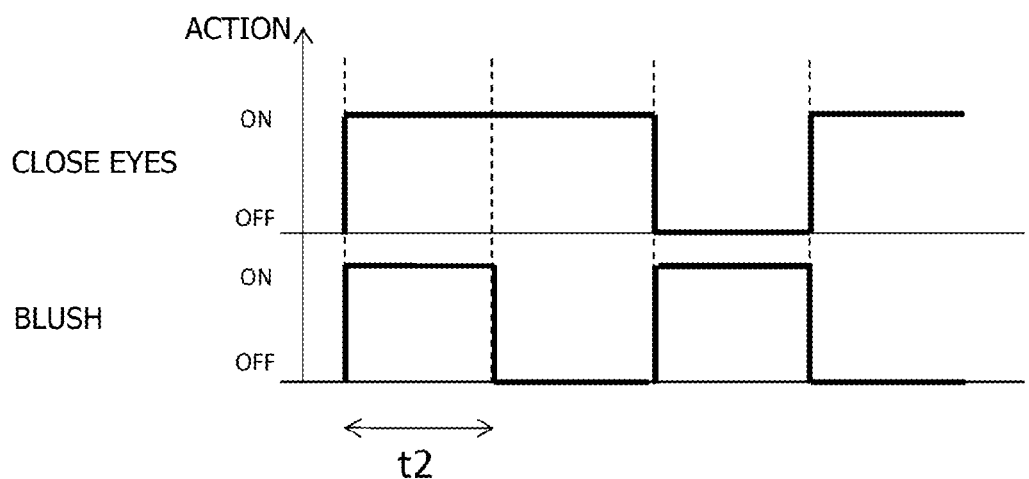
FIG. 10 is a diagram illustrating an ON/OFF pattern of the robot on a touch pad and a change made to a face image by the information processing device in accordance with the pattern in the present embodiment.

FIG. 10 illustrates the association of an ON/OFF pattern of the touch sensor action sections 156 of the robot 150 on the touch pad and a change made to a face image by the display control section 112 of the information processing device 10 in accordance with the pattern. It should be noted that the figure assumes that any one of the touch sensor action sections 156 is switched between ON and OFF. Further, in this example, the image is changed in ON/OFF patterns of the action during a time that is four given periods t2 long. For example, the ON/ON/OFF/ON action pattern closes the eyes of the face image as illustrated in the figure. The ON/OFF/ON/OFF action pattern causes the face to blush. Thus, such association-related information is set, for example, by a program in the display control section 112 of the information processing device 10.

When an image is changed on the basis of a value output from the environmental parameter sensor 174 as described above, the touch sensor action control section 180 internally holds a touch sensor action change table that associates conditions for the output value to make a change and the ON/OFF patterns of the action illustrated in the figure. For example, when the illuminance measured by an illuminance meter falls to or below a given threshold, that is, when the surroundings are dark, a face image with the eyes closed is shown, depicting an impression of the robot 150 asleep. Further, when the temperature measured by a thermometer rises to or above a threshold, that is, when the surroundings are hot, the face blushes, depicting an impression of the robot 150 feeling hot.

As described above, even more varied settings are possible by combining the patterns of the action of the plurality of touch sensor action sections 156 available with the robot. Further, the actuators may be driven and sounds may be output in the same manner as described above in addition to changing the image. In this case, a signal representing a pattern of the action of the touch sensor action sections 156 is input to the information processing device 10 from the robot 150. Then, a signal representing a pattern of the brightness change appropriate to the action pattern is input to the robot 150 from the information processing device 10.

The input of signal by the touch sensor action sections 156 can be implemented by means other than the ON/OFF pattern of the action illustrated in FIG. 10. For example, it is made possible to change the positions of the touch sensor action sections 156 on the bottom face of the robot, and mechanisms such as actuators are provided to control these positions. Then, the space between two touch sensors (e.g., space between coordinates (x1, y1) and (x2, y2) in FIG. 8) is changed under control of the touch sensor action control section 180 so that the space is supplied to the information processing device 10 as an input value. In this case, a variable itself representing the space can be used as an input value. This permits a setting that offers high temporal resolution such as gradually changing an image to match a gradual change in space.

Figure 11:
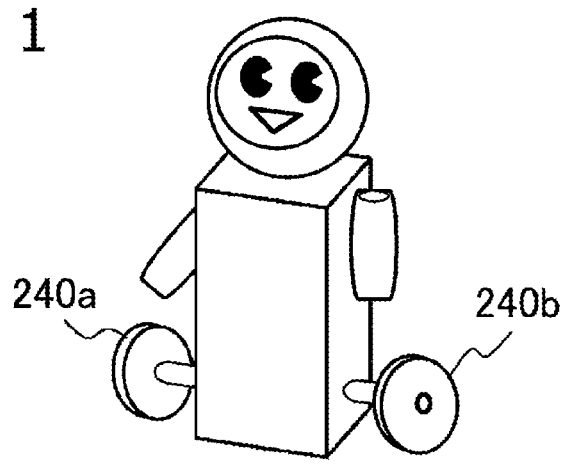
FIG. 11 is a diagram illustrating a modification example of the robot in the present embodiment.

FIG. 11 illustrates a modification example of the robot. A robot 250 includes wheels 240a and 240b, making it possible to move on the touch panel. The robot 250 is identical to the robot 150 in all other respects of the configuration. The display control section 112 of the information processing device 10 controls the brightness change patterns of the areas that correspond to the left and right optical sensors 160 provided on the bottom face of the robot 250 independently from each other. This allows the operation control section 184 of the robot 250 to control the rotation and orientation of axles of the left and right wheels 240a and 240b independently from each other.

As a result, the robot 250 can be moved along a route determined by the information processing device 10. In this case, the area of the touch panel corresponding to the bottom face of the robot 250 changes. Therefore, the display control section 112 of the information processing device 10 continues to acquire position coordinates of contact points from the action detection section 110, tracking the contact areas in accordance with the acquired coordinates and moving the area in which to change the face image and the brightness. It should be noted that the means for moving the robot 250 is not limited to the wheels 240a and 240b. For example, magnets may be provided on the bottom face of the robot 250 and a mechanism may be provided on the touch panel to produce a magnetic field so that the robot 250 moves with the change in magnetic field in question. Similarly, an electric field may be used.

Figure 12:
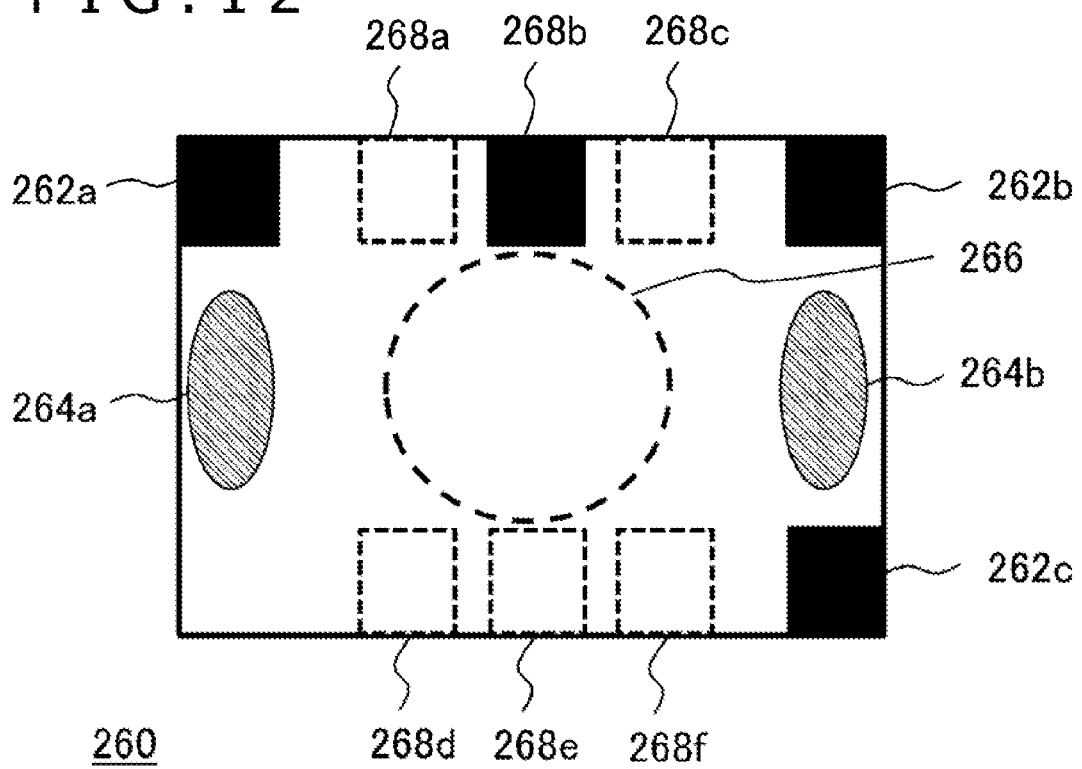
FIG. 12 is a diagram illustrating a modification example of a configuration of a bottom face of the robot in the present embodiment.

FIG. 12 illustrates a modification example of the configuration of the bottom face of the robot. A bottom face 260 in the figure includes an image grabbing terminal section 266, optical sensors 264a and 264b, and touch sensor action sections 262a to 262c provided at three of the four corners of the bottom face similarly to the configuration described above. The bottom face 260 further includes six touch sensor action sections 268a to 268f. Then, the individual robot can be identified on the basis of the positions of those of the six touch sensor action sections that are ON. In the example of the figure, black-filled and hollow areas show that the touch sensor action section 268b is ON and all other sections are OFF. It should be noted that the three touch sensor action sections 262a to 262c for identifying the areas of the bottom face are ON.

Figure 13:
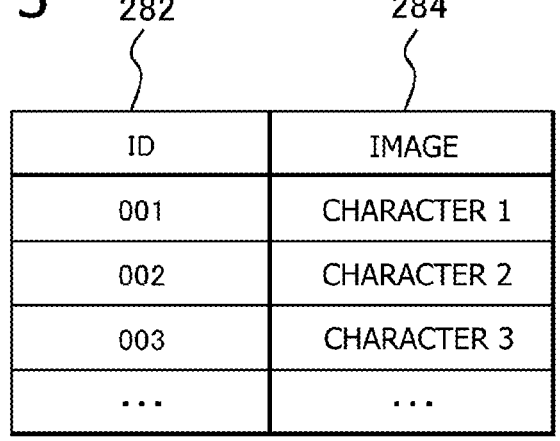
FIG. 13 is a diagram illustrating an example of a table referenced by a display control section when a face image specific to the robot is shown in the present embodiment.

When a robot having a bottom face as described above is placed on the touch panel, the action detection section 110 of the information processing device 10 detects contact not only at the positions of the three touch sensor action sections 262a to 262c but also at the position of the touch sensor action section 268b. As a result, the display control section 112 identifies the robot on the basis of these positions, showing a face image appropriate to the robot on the display device. FIG. 13 illustrates an example of a table referenced by the display control section 112 when a face image specific to the robot is shown using the touch sensor action sections. A robot identification table 280 includes an ID column 282 and an image column 284.

The ID column 282 represents robot identification numbers. Rules are set, for example so that when only the first touch sensor action section 268a of the six touch sensor action sections 268a to 268f is ON, the identification number of the robot is "001." When only the second touch sensor action section 268b is ON, the identification number of the robot is "002." Then, the image column 284 represents names of image data of face images to be shown on the robots having the respective identification numbers. For example, the face image named "Character 1" is shown on the robot having identification number "001." The face image named "Character 2" is shown on the robot having identification number "002." Image data is stored separately, for example, in a memory that can be referenced by the display control section 112.

Association between robot identification numbers and face images may be set in advance. Alternatively, robot identification numbers may be associated with face images by the user at the initial startup. Further, avatar images created by the user and images photographed by the user may be associated. As a result, each robot can have a different face, and the user can change a robot face according to his or her mood. It should be noted that if a robot identification number is assigned to a combination of positions of two or more touch sensor action sections that are ON, more robots can be identified. Further, what to be changed by an identification number is not limited to an image such as a face and may be operation, sound output, emission color, and so on, or a combination thereof.

Further, the display control section 112 may show not only, for example, a face image at the position in the display device that matches the bottom face of the robot but also a given image at an exposed area other than that position. When the robot is placed on the screen of the display device, the screen is equivalent to the "place" where the robot is located. Therefore, an image representing a ground surface, a street, a stage, and so on or a texture image representing a surface of some kind may be shown. Alternatively, images of other characters, animals, plants, and so on may be shown around the robot. Still alternatively, the image to be shown may be changed in accordance with the robot. Also in this case, it is only necessary to associate robot identification numbers with images to be shown and change the image in accordance with the positions of the touch sensor action sections that are ON in the same manner as done above for face images.

Figure 14:
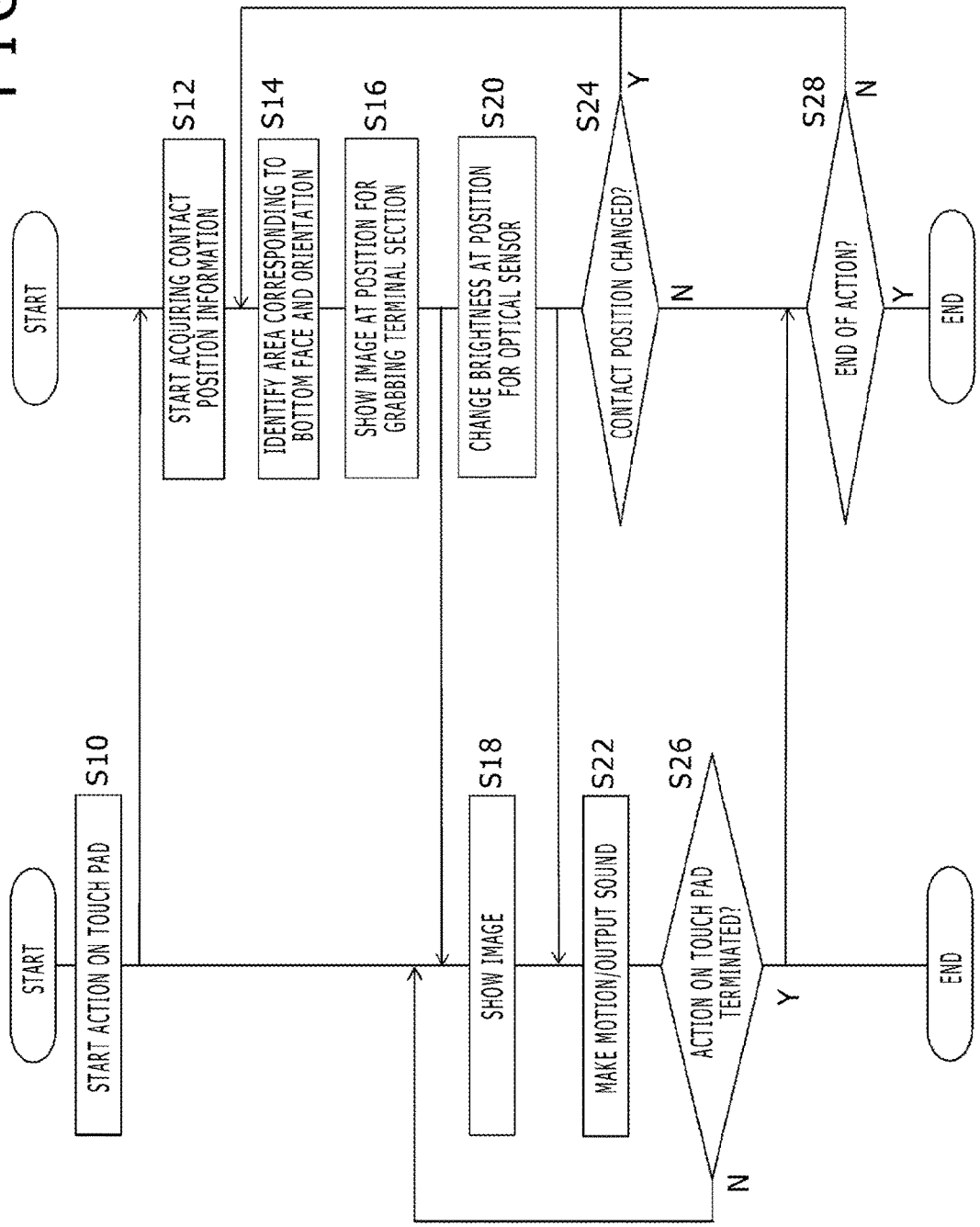
FIG. 14 is a flowchart illustrating a processing procedure for making a change to a mode of the robot through coordination between the robot and the information processing device in the present embodiment.

A description will be given next of the operation of the robot and the information processing device that can be achieved by the above configuration. FIG. 14 is a flowchart illustrating a processing procedure for making a change to a mode of the robot through coordination between the robot and the information processing device. First, the robot 150 begins to act on the touch pad of the information processing device 10 (S10). More specifically, the action of the touch sensor action sections 156 on the touch pad begins when the action thereof is turned ON by the user placing the robot 150 on the touch panel 50 of the information processing device 10 or turning ON the power for the robot placed on the touch pad. As a result, the action detection section 110 of the information processing device 10 begins to acquire information about the positions with which the touch sensor action sections 156 of the robot 150 are in contact (S12).

This allows the display control section 112 of the information processing device 10 to identify the area corresponding to the bottom face of the robot and the robot orientation from the relative positional relationship between the contact points (S14). Then, the display control section 112 shows a face image at the position of the area in question that matches the position of the image grabbing terminal section 164 of the robot (S16). At this time, if contact representing one of the robot identification numbers illustrated in FIG. 12 is detected at S14, the image data for the robot in question is read from the memory and shown on the basis of the identification number. If the image is not changed for each robot, it is only necessary to use given image data.

It should be noted that, prior to this processing step, the positional relationship between the detection points of the touch pad and the pixels of the display device is acquired. This ensures that a face image, for example, is shown at a proper size in the detected area corresponding to the bottom face of the robot even in the event of a difference in resolution between the two depending on the information processing device used. For example, software executed by the information processing device 10 may automatically read the resolutions of the two that are stored in advance and acquire the positional relationship. Alternatively, the user may input the device type in advance.

Still alternatively, a database may be prepared in the information processing device 10 that associates robot identification numbers with actual sizes of the bottom faces of the robots so that the size, in pixels, of the image to be shown is adjusted on the basis of the detected actual size of the robot 150. At this time, the positions where robot contact is detected, the positions of the areas in which to change the brightness, and other positions that are used for communication between the robot 150 and the information processing device 10 may be optimized. For example, if the bottom face of the robot is small in size, the two are arranged as far apart from each other as possible to prevent interference. The contact detection positions are also kept at least at a given distance from each other to prevent faulty detection.

Thus, if the detection positions and display area are optimized in this manner, the information processing device 10 notifies the robot 150, for example, of the identification number that represents the layout thereof using brightness change, thus ensuring consistency during subsequent communication. Further, if the image grabbing terminal section 164 and the optical sensors 160 are located at different positions from one robot to another, the information processing device 10 also holds a database that associates robot identification numbers and information of their positions on the bottom face. Then, the information processing device 10 determines the position at which to show a face image and the position of the area in which to change the brightness in accordance with the positional information corresponding to the detected robot.

The image shown is grabbed from the image grabbing terminal section 164 of the robot 150 and shown on the image display section 166 provided at a given position such as the face section of the robot by the image transfer section 182 (S18). On the other hand, the display control section 112 of the information processing device 10 changes the brightness at the positions that correspond to the positions of the optical sensors 160 in the area corresponding to the bottom face of the robot (S20). The optical sensors 160 of the robot acquire the change in brightness. If a motion or sound output is set for the brightness change in the robot operation table, the operation control section 184 drives the actuators 168 or outputs a sound from the speaker 172 (S22).

The processing steps in S20 and S22 need not be performed at all times. Instead, these steps may be performed as appropriate when a preset condition is satisfied or at a programmed time as described above. If the robot is moved by the wheels, or if a signal input (not shown in the flowchart) based on an environmental parameter change is accepted from the robot 150, the action detection section 110 of the information processing device 10 continues to detect information about the positions in which the touch sensor action sections 156 of the robot 150 are in contact. Then, if the positions of the contact points change due to such movement or signal input (Y in S24), the area corresponding to the bottom face of the robot and the robot orientation are identified again (S14), or the image is changed in accordance with the signal input (S16).

Thus, the information processing device 10 shows images and changes the brightness at all times while at the same time identifying the area corresponding to the bottom face of the robot 150 (N in S24, N in S28, S14, S16, S20, and S24), handling tasks such as showing images on the robot 150, moving the robot 150, and outputting sounds (N in S26, S18, and S22). If the action on the touch pad stops because the user removes the robot 150 from the touch panel 50 or turns OFF the power for the robot 150 (Y in S26), the action detection section 110 of the information processing device 10 detects that the action has been stopped (Y in S28). As a result, both the robot 150 and the information processing device 10 terminate their processing steps.

In the embodiment described above, the robot and the information processing device respond to each other via a touch panel of the information processing device. The touch panel includes a touch pad and a display device. More specifically, the position with which the robot is in contact and its orientation are detected using the touch pad. An image is shown in the area corresponding to the contact surface, thus showing the image in question on a given portion of the robot. An input signal from the information processing device to the robot is implemented by a brightness change pattern of the display device, whereas an input signal from the robot to the information processing device is implemented by a change in the action of the robot on the touch pad. This ensures that a variety of modes are available that are triggered by a processing task performed by the robot itself or the information processing device, allowing for complicated and interesting changes to be made to the robot even when the robot is simple in configuration.

Further, where the touch pad is acted on is utilized as an input signal from the robot to the information processing device. This makes it possible to identify each individual robot, thus allowing the information processing device to change the image to be shown on the robot on the basis of the identification. As a result, robots themselves can be offered at low prices, thus allowing users to collect various robots and change the appearance of each robot to match their preferences. The present embodiment can be implemented by a simple act of placing the robot on the touch panel, thus eliminating the need to increase the number of terminals with increase in the number of robots or have ready cables. Instead, a number of robots can be arranged side by side and moved independently of each other.

Thus, the present invention has been described on the basis of the embodiment. It is to be understood by those skilled in the art that the present embodiment is illustrative, that the combination of components and processes can be modified in various ways, and that such modification examples also fall within the scope of the present invention.

Figure 15:
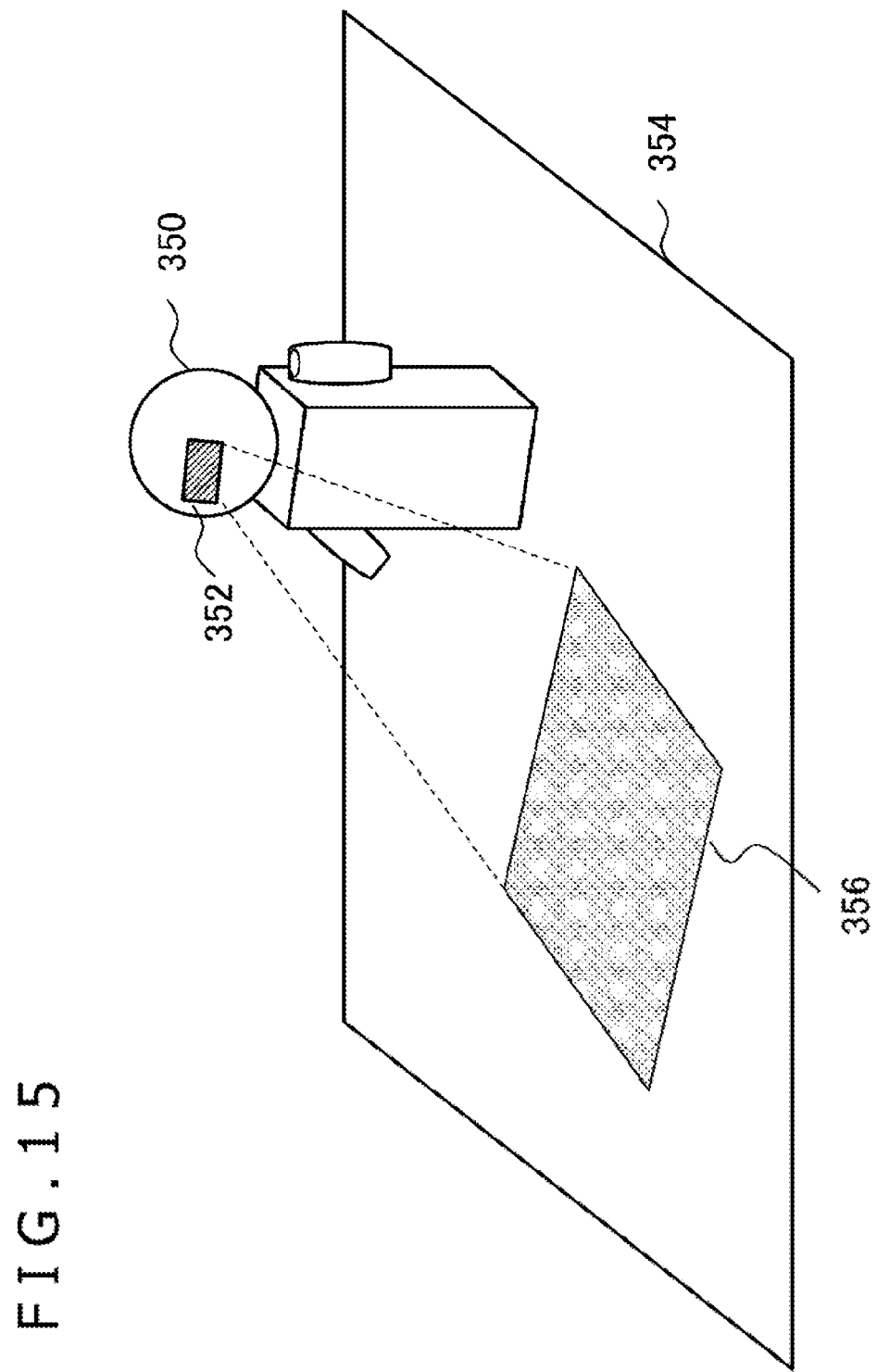
FIG. 15 is a diagram illustrating the robot in a mode in which the robot projects an image the robot has grabbed onto other object as a modification example of the present embodiment.

For example, an example was illustrated in the present embodiment in which a face image appears in the face section of the robot. However, an image grabbed by the robot once may be projected onto another object. FIG. 15 illustrates the robot in such a mode. In this example, a face section 352 of a robot 350 plays a role of a projector that enlarges a grabbed image with a lens, forming the projected image on a touch panel 354 (image area 356).

Similarly as in the present embodiment, an image (not shown) to be projected onto the image area 356 appears in the area inside the touch panel 354 that corresponds to the bottom face of the robot 350. The image is grabbed by the robot 350 once, and projected onto the touch panel 354, thus allowing rays of light to be emitted from the eyes of the robot 350 and forming an image. Also in this case, it is possible to depict a more dramatic scene than simply showing an image on the touch panel 354 similarly as in the present embodiment despite a relatively simple configuration of the robot 350. It should be noted that the information processing device 10 may show an image directly in the image area 356 of the touch panel 354 rather than the robot 350 projecting the image so that it looks as if the robot 350 projects the image. At this time, light having directivity may be emitted from the robot 350, thus giving an added touch of dramaticness to the projected scene.

Alternatively, the robot 350 may be moved by the user as a piece of a board game such as a roll-and-move game. In this case, the squares of the board, for example, may be shown on the touch panel 354 so that the robot speaks or an image is projected depending on how the user advances. The robot may have wheels as does the robot 250 illustrated in FIG. 11 so that the robot itself advances the squares. In this case, the user operates an information processing device that is connected to the touch panel 354. In response, the information processing device in question changes the brightness of the area inside the touch panel 354 corresponding to the bottom face of the robot, thus moving the wheels.

REFERENCE SIGNS LIST

10 Information processing device, 20 Display device, 21 Touch pad, 50 Touch panel, 60 CPU, Main memory 64, 110 Action detection section, 112 Display control section, 114 Display section, 150 Robot, 152 Face section, 154 Arm section, 156 Touch sensor action section, 160 Optical sensor, 164 Image grabbing terminal section, 166 Image display section, 168 Actuator, 170 Control circuit, 172 Speaker, 174 Environmental parameter sensor, 180 Touch sensor action control section, 182 Image transfer section, 184 Operation control section, 250 Robot, 240a Wheel, 350 Robot

INDUSTRIAL APPLICABILITY

As described above, the present invention is applicable to computers, gaming devices, toys, robots, and so on.

The invention claimed is:

1. An information processing system comprising:
an information processing device connected to a touch pad; and
an output device that can be maintained in contact with the touch pad;
the information processing device including
an action detection section adapted to acquire information on a contact position from the touch pad, and
a display control section adapted to identify a condition of the output device on the basis of the contact position so as to only change a display image shown on a display device provided under the touch pad in accordance with the condition,
wherein an entirety of the display image is provided under the touch pad.

2. The information processing system according to claim 1,
wherein the display control section identifies an area corresponding to a contact surface of the output device and changes what shows at least at a position inside the area in question corresponding to an input terminal section provided on a contact portion of the output device, and
the output device includes an output control section adapted to acquire information on a change in what shows on the display device from the input terminal section and display at least a portion of the display image.

3. The information processing system according to claim 2,
wherein the display control section of the information processing device shows a given image at the position corresponding to the input terminal section, and
the output control section of the output device causes the image to appear on a given portion of the output device.

4. The information processing system according to claim 2,
wherein the display control section of the information processing device changes pixel brightness at the position corresponding to the input terminal section in a given pattern over time,
the output control section of the output device drives an internal actuator in a manner associated with the brightness change pattern so as to rotate wheels provided on the output device and move the output device, and
the display control section of the information processing device tracks a movement of the area corresponding to the contact surface in response to the movement of the output device so as to change where to change the pixel brightness over time.

5. The information processing system according to claim 2,
wherein the display control section of the information processing device shows a given image at the position corresponding to the input terminal section, and
the output control section of the output device shows the image by projecting the image onto a different object.

6. The information processing system according to claim 2,
wherein the display control section of the information processing device changes pixel brightness at the position corresponding to the input terminal section in a given pattern over time, and
the output control section of the output device causes at least driving of internal actuators, sound output or light emission to take place, the driving of internal actuators, sound output or light emission being associated with the brightness change pattern.

7. The information processing system according to claim 1,
wherein the output device includes a touch sensor action control section adapted to switch, in a given pattern, between two conditions, one in which an action from the output device for the touch pad to detect contact takes place and another in which such an action does not take place, and
the display control section of the information processing device makes, to a display image, a change associated with the pattern for switching the condition for the action.

8. The information processing system according to claim 7,
wherein the output device further includes an environmental parameter sensor adapted to measure a physical quantity of a surrounding environment, and
the touch sensor action control section is activated in response to a change in the physical quantity.

9. The information processing system according to claim 1,
wherein the output device includes
a plurality of touch sensor action sections adapted to cause an action from the output device for the touch pad to detect contact to take place partially, and
a touch sensor action control section adapted to change positions of the touch sensor action sections; and
the display control section of the information processing device changes a display image in accordance with a space between a plurality of contact positions detected by the touch pad.

10. The information processing system according to claim 1,
wherein the output device includes
a plurality of touch sensor action sections adapted to cause an action from the output device for the touch pad to detect contact to take place partially, and
a touch sensor action control section adapted to switch, for each of the touch sensor action sections, between two conditions, one in which an action of the touch sensor action sections on the touch pad takes place and another in which such an action does not take place; and
the display control section of the information processing device changes a display image in accordance with a contact position detected by the touch pad or a change in the contact position over time.

11. An information processing device comprising:
an action detection section adapted to acquire, from a touch pad, information on a contact position of an output device that is in contact with the touch pad; and
a display control section adapted to identify a condition of the output device on the basis of the contact position so as to only change a display image shown on a display device provided under the touch pad in accordance with the condition, wherein an entirety of the display image is provided under the touch pad.

12. An output device that can be maintained in contact with a touch pad that is connected to an information processing device, the output device comprising:

an input terminal section adapted to detect changes made by the information processing device to a display image shown on a display device provided only directly under the touch pad on the basis of a contact position detected by the touch pad; and an output control section adapted to produce an output appropriate to the change made to the display image.

13. An information processing method for an information processing device, comprising:

acquiring, from a touch pad, information on a contact position of an output device that is in contact with the touch pad; and identifying a condition of the output device on the basis of the contact position so as to only change a display image shown on a display device provided under the touch pad in accordance with the condition, wherein an entirety of the display image is provided under the touch pad.

14. A non-transitory computer readable medium having stored there on a computer program for a computer, the program comprising:

by an action detection section, acquiring, from a touch pad, information on a contact position of an output device that is in contact with the touch pad; and by a display control section, identifying a condition of the output device on the basis of the contact position so as to only change a display image shown on a display device provided under the touch pad in accordance with the condition, wherein an entirety of the display image is provided under the touch pad.

* * * * *